(12) United States Patent
Albeck et al.

(10) Patent No.: US 7,006,086 B2
(45) Date of Patent: Feb. 28, 2006

(54) METHOD AND APPARATUS FOR ACCURATE ALIGNMENT OF IMAGES IN DIGITAL IMAGING SYSTEMS BY MATCHING POINTS IN THE IMAGES CORRESPONDING TO SCENE ELEMENTS

(75) Inventors: Dan Albeck, Giv'at Shmuel (IL); Ron Gershon, Rehovot (IL); Avner Segev, Raanana (IL)

(73) Assignee: Cognitens Ltd., Ramat Hasharon (IL)

( * ) Notice: Subject to any disclaimer, the term of this patent is extended or adjusted under 35 U.S.C. 154(b) by 314 days.

(21) Appl. No.: 10/025,175

(22) Filed: Dec. 19, 2001

(65) Prior Publication Data

US 2002/0140670 A1    Oct. 3, 2002

(51) Int. Cl.
*G09G 5/00*    (2006.01)
*G06T 15/00*    (2006.01)

(52) U.S. Cl. ...................... 345/419; 345/156
(58) Field of Classification Search ............... 345/419, 345/619, 420, 156; 382/154, 276, 287, 291; 356/601–603; 348/370; 358/474, 488
See application file for complete search history.

(56) References Cited

U.S. PATENT DOCUMENTS

| | | | |
|---|---|---|---|
| 5,644,386 A * | 7/1997 | Jenkins et al. | 382/224 |
| 5,835,241 A * | 11/1998 | Saund | 358/488 |
| 6,016,147 A * | 1/2000 | Gantt | 345/419 |
| 6,125,197 A * | 9/2000 | Mack et al. | 382/154 |
| 6,466,701 B1 * | 10/2002 | Ejiri et al. | 382/287 |
| 6,771,394 B1 * | 8/2004 | Nakanishi et al. | 358/474 |
| 2002/0033818 A1 | 3/2002 | Lin | 345/419 |

\* cited by examiner

*Primary Examiner*—Bipin Shalwala
*Assistant Examiner*—David L. Lewis
(74) *Attorney, Agent, or Firm*—Nath & Associates; Gregory B. Kang; Derek Richmond (57) ABSTRACT

A digital imaging system is described that facilitates the location of anchors or targets in images of a scene. In one aspect, the digital imaging system makes use of differences as between the properties of the surfaces of the targets and the properties of the surfaces of the objects that are to be mensurated, reconstructed, etc., to facilitate providing uniform illumination of the targets when recording a set of images of the scene, thereby reducing noise that may arise in connection with determining the locations of the targets if they were illuminated by structured illumination, while contemporaneously providing that the objects can be illuminated by structured illumination when the images are recorded. In this aspect, the digital imaging system can use the positions of the targets in the images to relate a local coordinate system associated with the image set to a global coordinate system. In a second aspect, the digital imaging system makes use of one or more of a plurality of algorithms to determine the locations of targets in the images of the scene in the respective objects. In this aspect, the digital imaging system records two sets of images, including a baseline set and a working set. The baseline set is recorded using uniform illumination, with the baseline set comprising only images of the targets. The working set is recorded using structured illumination, with the working set comprising image of both the targets and the objects. The working set is used in connection with mensuration, virtual reconstruction, etc., and one or more of the algorithms are used to determine the likely positions of the targets in the images in the working image set, and to determine transformations between the baseline and working image set such that the local coordinate system associated with the working image set can be related to the global coordinate system.

49 Claims, 7 Drawing Sheets

FIG. 1

*FIG. 3*  CORELLATION METHODOLOGY

FIG. 4    LEAST SQUARES METHODOLOGY

FIG. 5    EDGE SEARCH METHODOLOGY

FIG. 6      DISTANCE TRANSFORM METHODOLOGY

FIG. 7    SHAPE SEARCH METHODOLOGY

METHOD AND APPARATUS FOR ACCURATE ALIGNMENT OF IMAGES IN DIGITAL IMAGING SYSTEMS BY MATCHING POINTS IN THE IMAGES CORRESPONDING TO SCENE ELEMENTS

FIELD OF THE INVENTION

The invention relates generally to the field of digital imaging, and more particularly to systems and methods for aligning images in digital imaging systems.

BACKGROUND OF THE INVENTION

Digital imaging systems record many images of a scene for various applications. Some applications require accurate knowledge of the positions of points in the scene, in relation to a three-dimensional coordinate system, which, in turn, requires accurate knowledge of the locations of projections of the points in the respective images. One illustrative application is photogrammetry, in which information such as distances between points in a scene, heights of points in the scene above a reference level, and so forth, can be determined from measurements between and among points on the two-dimensional images that were recorded of the scene. Another application is three-dimensional virtual reconstruction of objects in a scene from the two-dimensional images that were recorded of the scene. Such virtual reconstructions can be used, for example, for precise measurement of features of the reconstructed objects.

In some applications, it is desired to measure certain features in a scene with a high degree of accuracy. Such measurements either require that information about the scene be provided to the imaging system, or that the imaging system be able to extract such information from the images in an automated manner. In either case, it is helpful to the imaging system if there are certain features in the scene, as recorded in the images, that can be accurately detected and whose positions and sizes can be accurately measured. These features, which may be referred to as "anchor points" or "targets," can be planted artificially within the scene to provide reference information for the imaging system. The targets possess predetermined optical characteristics and can readily be automatically differentiated by the imaging system from other objects in the scene. In addition, the imaging system knows the positions in the scene, relative to a three-dimensional coordinate system, of respective ones of the targets. The imaging system, in turn, will need to be able to accurately determine which pixels in the images recorded of the scene relate to respective ones of the targets in the scene. Since the imaging system will need to make a quick and accurate identification of the targets, several problems can arise. In particular, generally special consideration needs to be given to the type of material of which the targets are made, their shapes, and so forth. One technique has been to provide the targets with specific shapes and contours, which can be coded in a predetermined way to ensure that they will stand out and be readily distinguishable from the other objects in the scene. The targets can be made from materials with predetermined surface characteristics, such as diffuse or highly reflective, as long as their shapes and/or reflectance differ considerably from the expected shapes and/or reflectance of the objects in the scene that are to be subject to mensuaration, reconstruction, and so forth.

Another technique involves the use of directional reflecting materials, such as retro-reflective materials for the targets. An object made of a retro-reflective material reflects light that is incident thereon predominately back in the direction of the light source from which the light originates. Types of retro-reflective materials are well known, and are used in, for example, signs, safety reflectors and so forth. The reflection characteristic of the material is generally independent of the angle of incidence of the light on the surface over a relatively wide range of incidence angles. If the objects in the scene that are to be subject to mensuration, reconstruction, and so forth, are not made of retro-reflective materials, the reflective characteristics of their surfaces will differ substantially from the reflective characteristics of the targets, and, if they are properly illuminated, as will be described below, it can be relatively easy for the imaging system to distinguish between the targets and the other objects in the scene.

Yet another technique involves the use of targets that essentially provide holes in the scene by, for example, absorbing light incident thereon or by reflecting the light in such a manner that it will not be directed to the image recording device(s) when images thereof are being recorded.

In order to accurately determine the positions of the targets, they need to be uniformly illuminated so that the appearance of each target will not vary over the field of view or from image to image. However, if the imaging system requires structured illumination, which provides a textured appearance for surfaces that what might otherwise appear relatively featureless, the simultaneous use of structured illumination and uniform illumination will typically reduce the effect of the structured illumination on the scene, which, in turn, can interfere with the imaging system's ability to perform its mensuration, virtual reconstruction, and so forth, operations. On the other hand, if structured lighting is used alone or predominately to illuminate the scene, including the targets, the appearance of respective ones of the targets can change from image to image, which will make it more difficult for the imaging system to identify the projections of a respective in the various images. In addition, the structured illumination can cause projections of the targets to appear deformed, which can increase the difficulty of accurately determining their locations in the images. Finally, if both structured lighting and uniform illumination are used, but for recording of successive images from what is hoped to be the same direction, problems can arise since one or both of the camera or other device that records the images and the object(s), including the target(s), in the scene can vibrate or otherwise move, which, in turn, can cause inaccuracies in registration between the two images. The time interval between times at which the camera can record successive images can vary based on a number of variables, including, for example, image size and resolution, image buffer download time, and so forth, but often the time interval is long enough for such differences to have adverse effects. This can significantly reduce the accuracy of the mensuration, reconstruction, and/or other operations that the imaging system may be required to perform.

SUMMARY OF THE INVENTION

The invention provides new and improved systems and methods for accurately aligning images in a digital imaging system.

In brief summary, the invention provides a new digital imaging system and method that facilitates the location of anchors or targets in images of a scene. The invention provides two general aspects. In one general aspect, the digital imaging system makes use of, for example, differences as between the properties of the surfaces of the targets and the properties of the surfaces of the objects that are to be mensurated, reconstructed, etc., to facilitate providing uniform illumination of the targets when recording a set of images of the scene, thereby reducing noise that may arise in connection with determining the locations of the targets if they were illuminated by structured illumination, while contemporaneously providing that the objects can be illuminated by structured illumination when the images are recorded. In this aspect, the digital imaging system can use the positions of the targets in the images to relate a local coordinate system associated with the image set to a global coordinate system.

A second general aspect makes use of one or more of a plurality of algorithms to determine the locations of targets in the images of the scene in the respective objects. In this aspect, the digital imaging system records two sets of images, including a baseline set and a working set. The baseline set is recorded using uniform illumination, with the baseline set comprising only images of the targets. The working set is recorded using structured illumination, with the working set comprising image of both the targets and the objects. The working set is used in connection with mensuration, virtual reconstruction, etc., and one or more of the algorithms are used to determine the likely positions of the targets in the images in the working image set, and to determine transformations between the baseline and working image set such that the local coordinate system associated with the working image set can be related to the global coordinate system.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
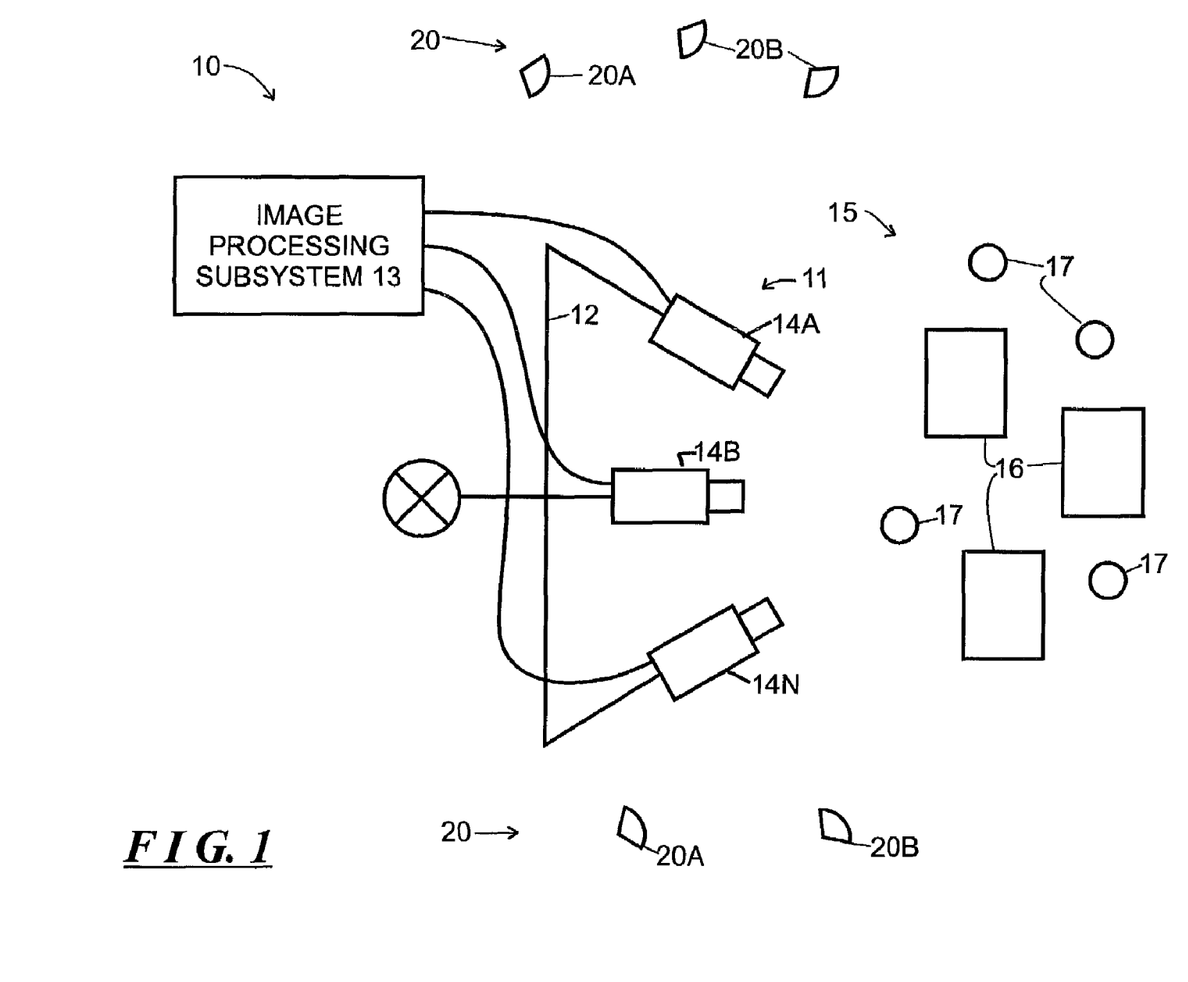
FIG. 1 schematically depicts a digital imaging system constructed in accordance with the invention.

FIG. 1 schematically depicts a digital imaging system 10 constructed in accordance with the invention. The digital imaging system 10 includes an optical head 11, a rig 12, and image processing subsystem 13. The optical head 11 comprises one or more cameras 14A, . . . , 14N (generally identified by reference numeral 14n) each of which can record images of a scene 15. The rig 12 is provided with a motion capability, for example, that can translate and/or rotate the optical head 11 relative to the scene 15 to allow the cameras 14n comprising the optical head 11 to record sets of images of the scene 15 from a plurality of positions and angular orientations. In one embodiment, the cameras 14n comprising the optical head 11 include image sensing and recording media such as CCD (charge coupled devices) or CMOS (complementary metal-oxide semiconductor) devices, which record images in electronic form, and the cameras 14n download the images to the image processing subsystem 13 after they are recorded for processing.

The particular processing operations performed by the image processing subsystem 13 will depend on the particular application for which the digital imaging system 10 is being used. If, for example, the digital imaging system 10 is to be used for mensuration of elements of the scene 15, the image processing subsystem 13 can determine distances between points on selected ones of a plurality of object(s), generally identified by reference numeral 16, in the scene, distances between points on objects 16 in the scene and some reference plane such as a floor, and the like. Similarly, if the digital imaging system 10 is to be used to generate a virtual three-dimensional reconstruction of one or more of the objects 16 in the scene, it can generate such a virtual reconstruction using one or more of a number of techniques that are known to those skilled in the art. In addition to the object(s) 16 that are to be measured, reconstructed, and so forth, the scene is also provided with a plurality of anchor points or targets, generally identified by reference numeral 17, whose positions relative to a selected global coordinate system are known. As is appreciated by those skilled in the art, a virtual reconstruction of a portion of a scene, from a set of images of that portion of the scene, will be in relation to a coordinate system that is related to that set of images, and the targets 17 facilitate relating such local virtual reconstructions to a unitary global coordinate system. Similarly, if the features of the objects undergoing mensuration require that multiple sets of images be recorded for the mensuration, the coordinates of the features as determined using the respective sets of images will need to be related to a unitary global coordinate system to enable them to be mensurated, and the targets facilitate that operation as well.

The scene 15 is illuminated by one or more light sources, generally identified by reference numeral 20. As will be described below, at least some of the light sources provide a structured illumination for the scene 15. Structured illumination is used to provide a pattern or texture on the object(s) 16 in the scene 15 that aids the image processing subsystem 13 in identifying, in a set of images that are used in generating a local virtual reconstruction, points in the images in the set that are images of the same point in the scene 15, which is useful in determining their coordinates in the respective local coordinate system. Generally, in a scene 15 that includes targets 17 in addition to the objects 16 that are to be subject to mensuration, virtual reconstruction, and the like, at least two successive images are recorded, one with texture illumination that is used in virtual reconstruction of object 16 and another with uniform illumination to measure the targets 17. In this case any relative movement between the object and the optical head that occurs during the image acquisition of the two images, as commonly happens in industrial environment, degrades the accuracy of the global measurement. Attempting to locate the targets 17 using only structured illumination will result in poor determination of the location of the targets since their images are deformed by the structured illumination's texture. The invention provides several arrangements, in two broad classes, that allow the digital imaging system 10 to record of images of scene 15, including both the objects 16 and targets 17, that are illuminated by structured illumination while enabling the accurate measurement the location of targets 17. This will allow the digital imaging system 10 to perform its mensuration operations, generate virtual reconstructions and the like, and determine their positions in the global coordinate system accurately with immunity to vibrations or other relative movements between the object and the optical head.

As noted above, the invention provides two broad classes of arrangements. In one broad class, the invention provides a set of arrangements that make use of selected lighting and image recording conditions, which, in combination with surface characteristics of the targets 17 and objects 16, allow the targets 17 to be readily differentiated from the objects 16, and which further allow the full target to be captured in the images without deformation that may be due to, for example, the texture that is due to structured illumination provided for the objects 16. In a second broad class, the invention provides a set of arrangements that make use of various algorithms to identify and distinguish targets 17 from the objects 16 in the images and to accurately determine the positions of the targets in the images despite the fact that images thereof are recorded while they are illuminated by structured illumination. The algorithm-based techniques can be used with the lighting condition/target surface characteristic techniques, but the algorithm-based techniques can also be used instead of the lighting condition/surface characteristic techniques when no lighting condition/target surface characteristic technique can be used. Digital imaging systems constructed to make use of a lighting condition/target surface technique in accordance with the invention will be described first, followed by digital imaging systems constructed to make use of an algorithmic technique in accordance with the invention.

Generally, digital imaging system 10 includes two sets of light sources, generally identified by reference numerals 20A and 20B. Light sources 20A are configured to provide unstructured, uniform illumination. On the other hand, light sources 20B are configured to provide structured illumination. In accordance with one aspect of the invention, the surfaces of targets 17 are retro-reflective and the surfaces of objects 17 are relatively diffuse. In that case the optical head is configured to locate the sources 20A near the lenses of the cameras and preferably the sources 20A are of a ring type in order to efficiently collect the retro reflection from the targets, and sources 20B are located far from the lenses of the camera in order that only small fraction or any of the light emitted by them and reflected by the retro reflective targets will enter the lenses of the cameras. In that case, the intensity of the unstructured, uniform illumination provided by the light sources 20A for targets 17 can be far lower than the intensity of the structured illumination provided by light sources 20B for objects 16.

Since the surfaces of the targets 17 are retro-reflective, they can readily reflect the relatively low-level illumination provided by light sources 20A. On the other hand, since the surfaces of objects 16 are generally relatively diffuse, they will not reflect the illumination provided by light sources 20A to any significant extent, in relation to the extent to which they will reflect the structured illumination that is provided by the light sources 20B, thereby maintaining the texture provided by the structured illumination. In that case, the two sets of light sources 20A and 20B can illuminate the scene 15 contemporaneously, and the targets 17 will reflect the unstructured, uniform illumination provided by light sources 20A, and so the targets 17 will appear to be uniformly illuminated in the images recorded by the cameras 14n.

The image processing subsystem 13 can process the images both for mensuration information, virtual reconstruction, and so forth of objects 16 since they were illuminated with structured illumination. On the other hand, the image processing subsystem 13 can process the image to determine accurately the location of targets 17 as they illuminated with uniform illumination in order to provide alignment information by which the local coordinate system that is associated with the positions of the cameras at which the images were recorded can be related to the global coordinate system.

In accordance with another aspect of the invention the surfaces of target 17 in the scene 15 are spectrally sensitive to and thus will absorb and or reflect light having different wavelengths. In that case digital imaging system 10 includes two sets of light sources, generally identified by reference numerals 20A and 20B. Light sources 20A are configured to provide unstructured, uniform illumination at a wavelength that will be reflected from the surfaces by targets 17. On the other hand, light sources 20B are configured to provide structured illumination at a wavelength that will not be reflected by surfaces of targets 17. The objects 16 should reflect the illumination provided by light sources 20B and may also reflect the illumination provided by light sources 20A. Preferably, the intensity of light sources 20A is less than the intensity of light sources 20B or the emitting spectrum of light sources 20A is narrower than the spectrum emitted by light sources 20B as to dominate the reflection of light from light sources 20B by objects 16, over the reflection of light from light sources 20A by objects 16.

Since the targets 17 reflect only the uniform light emitted by light sources 20A and they do not reflect the structured light emitted by light sources 20B their images as recorded by cameras 14n will appear uniform and will not be deformed by the structured illumination. Despite the fact that objects 16 reflect both the uniform and the structured illumination, their images as recorded by cameras 14n will appear textured, since, as described above, the intensity of illumination provided by light sources 20A is less than the intensity of the illumination provided by light sources 20B, or alternatively the emitting spectrum of light sources 20A is narrower than the spectrum emitted by light sources 20B as to dominate the reflection of light originated from light sources 20B by objects 16, over the reflection of light originated from light sources 20A by objects 16, In accordance with another aspect of the invention the digital imaging system 10 includes two sets of light sources, generally identified by reference numerals 20A and 20B. Light sources 20A are configured to provide unstructured, uniform illumination at one wavelength band and on the other hand light sources 20B are configured to provide structured illumination at another different wavelength band. The respective cameras 14n and image processing subsystem 13 can be configured to distinguish between the portions comprising the targets 17 and the objects 16. For example, if the uniform illumination provided by light sources 20A has a wavelength that is in the red portion of the visible spectrum, and if the structured illumination provided by light sources 20B has a wavelength that is in the blue portion of the visible spectrum, the image processing subsystem 13 can process separately, in each image as recorded by a respective camera 14n, portions that are in the red portion of the visible spectrum as comprising images of the targets 17 in the respective image, and portions that are in the blue portion. In this case the blue image will contain images of both the object 16 and the targets 17 in structured appearance and will be used for mensuration, reconstruction and so forth of object 16 and the red image will contain images of both object 16 and targets 17 in uniform appearance. The image processing subsystem 13 can distinguish between the targets and the object based on several conventional methodologies, including, for example, those based on gray level, edges, shape, and others as will be apparent to those skilled in the art. The location of the image of targets 17 can be accurately determined from the images recorded using uniform illumination. In addition, although the above example makes reference to illumination in wavelengths in the visible spectrum, it will be appreciated that the illumination may be in any part of the electromagnetic spectrum.

Figure 2:
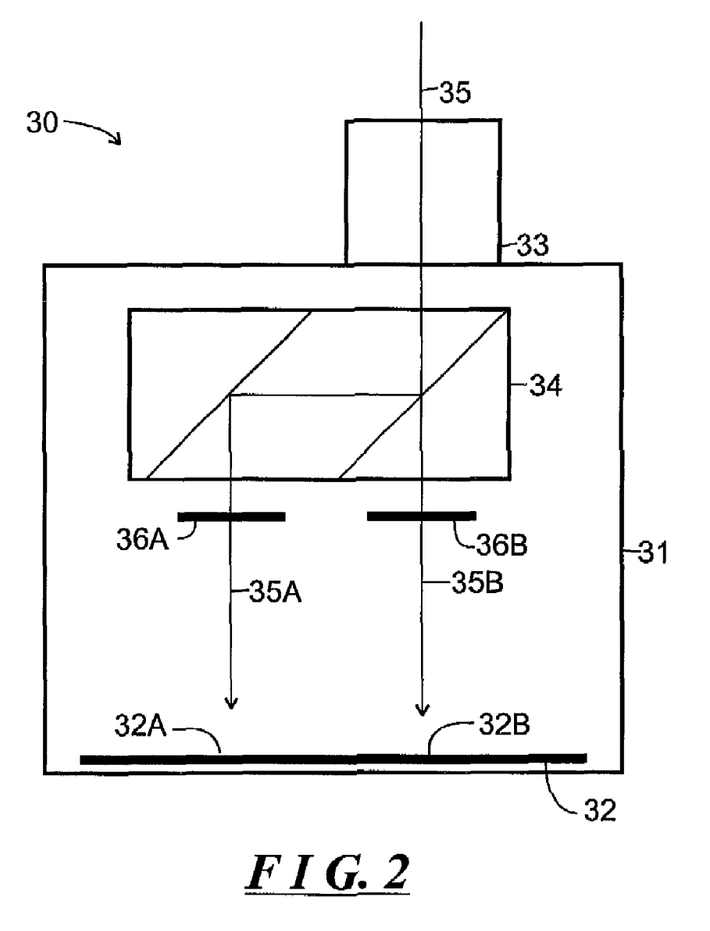
FIG. 2 schematically depicts a camera useful in one embodiment of the digital imaging system depicted in FIG. 1.

As an alternative to having the cameras 14n record images in color, the respective cameras can record images monochromatically in such a manner as to facilitate distinguishing between different wavelength bands. An illustrative camera, identified by reference numeral 30, is schematically depicted in FIG. 2. With reference to FIG. 2, the camera 30 includes a housing 31 that houses an image recording medium 32. A lens system 33 directs light received from the scene 15 to a beam splitting arrangement 34. The beam splitting arrangement 34, in turn, splits the light, represented by ray 35, that is received from the lens system 33 into two portions 35A and 35B. The portion 35A of the light from the beam splitting arrangement 34 is filtered by a filter 36A that passes light in the wavelength provided by light source 20A and blocks the light in the wavelength provided by light source 20B. The filter 36A directs that light passed thereby to a portion of the image recording medium 32 identified by reference numeral 32A. Similarly, the portion 35B of the light from the beam splitting arrangement is filtered by a filter 36B that passes light in the wavelength provided by light source 20B and blocks the light in the wavelength provided by light source 20A. The filter 36B directs that light passed thereby to a portion of the image recording medium 32 identified by reference numeral 32B. The disjoint portions 32A and 32B of the image recording medium can be processed independently by the image processing subsystem 13. The image processing subsystem 13 can process the image that is recorded in portion 32B of the image recording medium 32, that is, the portion that is associated with the structured illumination, to provide mensuration information, virtual reconstruction, and so forth. On the other hand, the image processing subsystem 13 can process the image that is recorded in portion 32A of the image recording medium 32, that is, the portion that is associated with the uniform illumination, to provide alignment information by which the local coordinate system that is associated with the positions of the cameras at which the images were recorded can be related to the global coordinate system.

A further aspect of the invention, which also is in the lighting condition/target surface technique class, will be described in connection with FIG. 1. Instead of using differences in wavelengths of the light as reflected by the surfaces of the objects 16 and the targets 17 to distinguish between the objects and targets, in this aspect polarization characteristics are used to distinguish between the objects 16 and targets 17. The surfaces of the targets 17 are configured to reflect light such as to preserve polarization, whereas the surfaces of objects 16 preferably reflect light in such a manner that polarization is not preserved. This can be accomplished by providing that the surfaces of targets 17 are retro-reflective, which reflect light in such a manner that the polarization of illumination incident thereon will be preserved, and the surfaces of objects 16 are diffuse, which reflect light in such a manner that the polarization of illumination incident thereon will not be preserved. The illumination provided by the light sources 20A that are to provide uniform illumination for the targets 17 in the scene 15 is polarized in a selected direction, for example, horizontal, whereas the structured illumination provided by the light sources 20B that are to provide illumination for the objects 16 is polarized in the orthogonal direction, for example, vertical. Preferably, the intensity of the illumination provided by the light sources 20A is much lower than the intensity of the illumination provided by the light sources 20B. The surfaces of targets 17 will reflect illumination provided by both light sources 20A and 20B. Since the retro-reflective surfaces of the targets 17 preserve polarization, the reflected light will have a horizontal component that corresponds to the uniform illumination provided by light sources 20A, and a vertical component that corresponds to the structured illumination provided by light sources 20B. The surfaces of objects 16 will also reflect illumination provided by both light sources 20A and 20B, but it will be appreciated that, since the intensity of the uniform illumination provided by light sources 20A will be much lower than the intensity of the structured illumination provided by light sources 20B, the light reflected by the surfaces of objects 16 will be primarily the structured illumination. However, since the surfaces of objects 16 are diffuse, the light reflected thereby will not preserve polarization of the light incident thereon, in which case the reflected structured light will have horizontal as well as a vertical components.

In addition, each camera 14n will be provided with a polarizer (not separately shown) ahead of its optical path that allow only horizontally polarized light, or horizontal components of light that is not horizontally polarized, to pass into the respective camera and be recorded thereby. As noted above, the targets 17 will reflect the uniform illumination provided by the light sources 20A, which is polarized horizontally, as well as that of the structured illumination provided by the light sources 20B, which is polarized vertically, in such a manner as to preserve polarization. However, in each camera 14n, the respective polarizer will allow only the horizontally-polarized uniform illumination from the targets 17 to pass and recorded on the respective image. Accordingly, the images of the targets 17 in the respective images will be uniform. On the other hand, since the surfaces of the objects 16 are diffuse, they do not preserve polarization. Accordingly, the structured illumination as reflected by the objects 16 will have both a horizontal and a vertical component, and the respective polarizer will allow the horizontal component of the structured illumination to pass, along with the horizontal component of the uniform illumination as provided by the light sources 20A, for recording on the respective image. Since, as noted above, the intensity of the uniform illumination provided by light sources 20A is much lower than the intensity of the structured illumination provided by light sources 20B, the light as reflected off the surfaces of objects 16 and recorded on the respective image will primarily be structured.

After the cameras 14n have recorded the images, they will be processed by the image processing subsystem 13, which will, inter alia, determine the locations of the targets 17 in the respective images. For each image, the image processing subsystem 13 can use, for example, a search methodology to search for regions of the image that are generally of uniform intensity, which regions it can determine contain images of the respective targets 17 in the respective image. On the other hand, the image processing subsystem 13 can determine that regions of the respective image that are bright, but not generally uniformly bright, contain images of the objects 16 as illuminated by the structured illumination.

A further aspect of the invention, which also is in the lighting condition/target surface technique class, will be described in connection with FIG. 1. In this aspect, instead of distinguishing between the objects 16 and the targets 17 in the images based on the wavelengths or polarization of the light as recorded in the respective images, the objects 16 and targets 17 are distinguished based on their positions. In that case, the cameras 14n are preferably high-resolution cameras having a relatively large field of view ("FOV"). The center of view of the cameras 14n is directed primarily toward the objects 16 in the scene 15. The targets 17 are preferably positioned some distance from the objects 16, but still within the field of view of the cameras 14. The light sources 20A that are to provide uniform illumination for the targets 17 are directed to the portions of the scene 15 in which the targets 17 are located. On the other hand, the light sources 20B that are to provide the structured illumination are directed to the portions of the scene 15 in which the objects 16 are located. Thus, the uniform illumination is limited to the periphery of the field of view of the cameras 14n, where the targets 17 are located, whereas the structured illumination is limited to the portions of the scene somewhat distant from the targets 17, in the portions of the scene 15 in which the objects 16 are located. This will allow the image processing subsystem 13 to readily identify the targets 17 in the scene 15 and determine their positions with a minimum of noise, while still providing structured illumination that is useful in connection with the mensuration, virtual reconstruction, and so forth, processing operations. As another alternative, the uniform illumination sources 20A is be directed to all scene 15 that lies within the field of view of cameras 14n but their intensity is much lower than the intensity of the structured illumination sources 20B, so objects 16 are primarily illuminated with structured light.

The light sources 20 used in connection with any of the aspects in the lighting condition/target surface technique class may be any conventional types of light sources for providing illumination of the required wavelengths, illumination of the required polarization direction(s), or illumination having the required pattern of uniform illumination proximate the periphery of the cameras' field(s) of view and structured illumination elsewhere, every feature in connection with the relevant aspects mentioned above.

As an alternative, the system 10 can make use of a computer controlled pattern generator, such as a computer-controlled LCD (liquid crystal display) pattern generator or DMD (digital micro-mirror device), and so forth, that is configured to provide a uniform illumination for the portions of the scene 15 that contain the targets 17 and a structured illumination for the portions of the scene 15 that contain the objects 16. In that alternative, the pattern generator initially provides a uniform illumination over the entire scene 15, and the cameras 14n will record a set of images of the scene 15. The image processing subsystem 13 can distinguish between the targets and objects in a conventional manner based on gray level, edge shape, or other methodologies as will be apparent to those skilled in the art. The image processing subsystem 13 will then determine the locations of the targets 17 in the scene 15 and enable the pattern generator to continue to provide the uniform illumination in regions of the scene 15 in which the targets are located, and to provide a structured illumination elsewhere within the fields of view of the cameras 14n, after which the cameras 14n will be enabled to record a second set of images. The second set of images will include the targets 17, which are illuminated by the uniform illumination, and the objects 16, which are illuminated by the structured illumination, which can be processed by the image processing subsystem 13 as described above. The intensities of the uniform illumination over the targets and the structured illumination over the other portions of the field of views of cameras 14n can be with different levels as to utilize efficiently the dynamic range of the system. It will be appreciated that the interval between the points in time at which the first set of images and the second set of images are recorded by the respective cameras 14n need not be small, since the first set of image is only needed to determine the locations of the targets in the scene 15 for controlling the pattern generator for the second set of images.

Another aspect of the invention will be described in connection with FIG. 1. If a camera 14n is capable of recording successive images sufficiently rapidly, it may not need to be provided with such light-ray splitting optical arrangements, nor need it record images in color, and the targets 17 and light sources need not have illumination of special wavelengths and or polarization directions. If the cameras 14n can record successive images sufficiently rapidly, each camera 14n can record successive images, with one image being recorded with light sources 20A, but not light sources 20B, illuminating the scene 15, and another image being recorded with light sources 20B, but not light sources 20A, illuminating the scene 15. If each camera 14n can record the successive images sufficiently rapidly, and if the light sources 20A and 20B can switch off and on sufficiently rapidly, any motion of the cameras 14n, the objects 16 and/or the targets 17 during the short time interval between the times at which the images are recorded would be so slight as to be effectively zero. In one embodiment, the cameras 14n make use of an Interline transfer CCD sensor, which can transfer an image to the image processing subsystem very rapidly. This allows the respective camera 14n to record successive images with a very short time interval therebetween, typically on the order of several microseconds. Since the short time interval between successive images is so short, the amplitude of any mechanical vibration of the rig 11 or movement of the objects 16 will be small enough that they can be ignored.

As noted above, the invention provides two broad classes of arrangement, with the second broad class comprising a set of arrangements that make use of algorithms to identify and distinguish targets 17 from the objects 16 in the images. Arrangements in the algorithm set may be find utility if, for example, no lighting condition/target surface characteristic technique can be used, but the algorithm-based techniques can be used along with the lighting condition/target surface characteristic techniques.

Common to all of the techniques in the algorithm class is that the cameras 14n in the digital imaging system 10 initially record two sets of images, namely, a set of baseline images and a set of t2 working images. When recording the set of baseline images, the light sources 20 illuminate the 13 targets 17 with uniform illumination. The objects 16 are either not illuminated, or the system is configured in such a way that the targets 17 are superior in their response. Since the objects 16 are not illuminated for the baseline image set, or, if they are illuminated, they are illuminated and recorded such that their sensitivity is negligible, images thereof will not be recorded in the baseline image set. However, since the targets 17 are uniformly illuminated, the locations of their images can be accurately determined in each of the baseline images in the baseline image set, and so their locations relative to the local coordinate system can also be accurately determined. For the working image set, the light sources 20 illuminate the scene 15, including both the targets 17 and the objects 16, using structured illumination, which, as noted above, can introduce noise in determining the locations of the targets 17 in the respective working image. The image processing subsystem 13 will use the working images in connection with mensuration, generation of a virtual reconstruction, and the like, in the local coordinate system in a conventional manner. On the other hand, since the images of the targets 17 in the working images will generally be deformed due to the structured illumination, the image processing subsystem 13 will use the images of the targets 17 in the baseline images to relate a local coordinate system to the global coordinate system in a conventional manner, provided the local coordinate system of the working images and the local coordinate system of the baseline images are the same. However, since the local coordinate system associated with the baseline images may differ slightly from the local coordinate system for the targets as recorded in the working images, the image processing subsystem 13 will make use of one or more of the algorithmic techniques that will be described below, to locate the images of the targets as recorded in the respective working images and generate a transformation that relates the local coordinate system(s) associated with the baseline images and the local coordinate system(s) associated with the working images. That transformation can, in turn, be used to determine the transformation between the local coordinate system associated with the working images and the global coordinate system.

Preferably, the cameras 14n will record the baseline images and the associated working images within a relatively short time interval, so that the transformation between the local coordinate systems associated therewith is relatively small. In addition, if a baseline image and the associated working image are recorded within a relatively short time interval, the targets 17 will be in approximately the same locations in the two images. However, the targets 17 may not be in precisely the same locations, since there may have been some movement, vibration, and the like by the digital imaging system 10 and/or the objects 16 and targets 17 in the scene 15 during the time interval. The transformation(s) as between the baseline images in the baseline image set and the associated working images in the working image set accounts for such movement.

Figure 3:
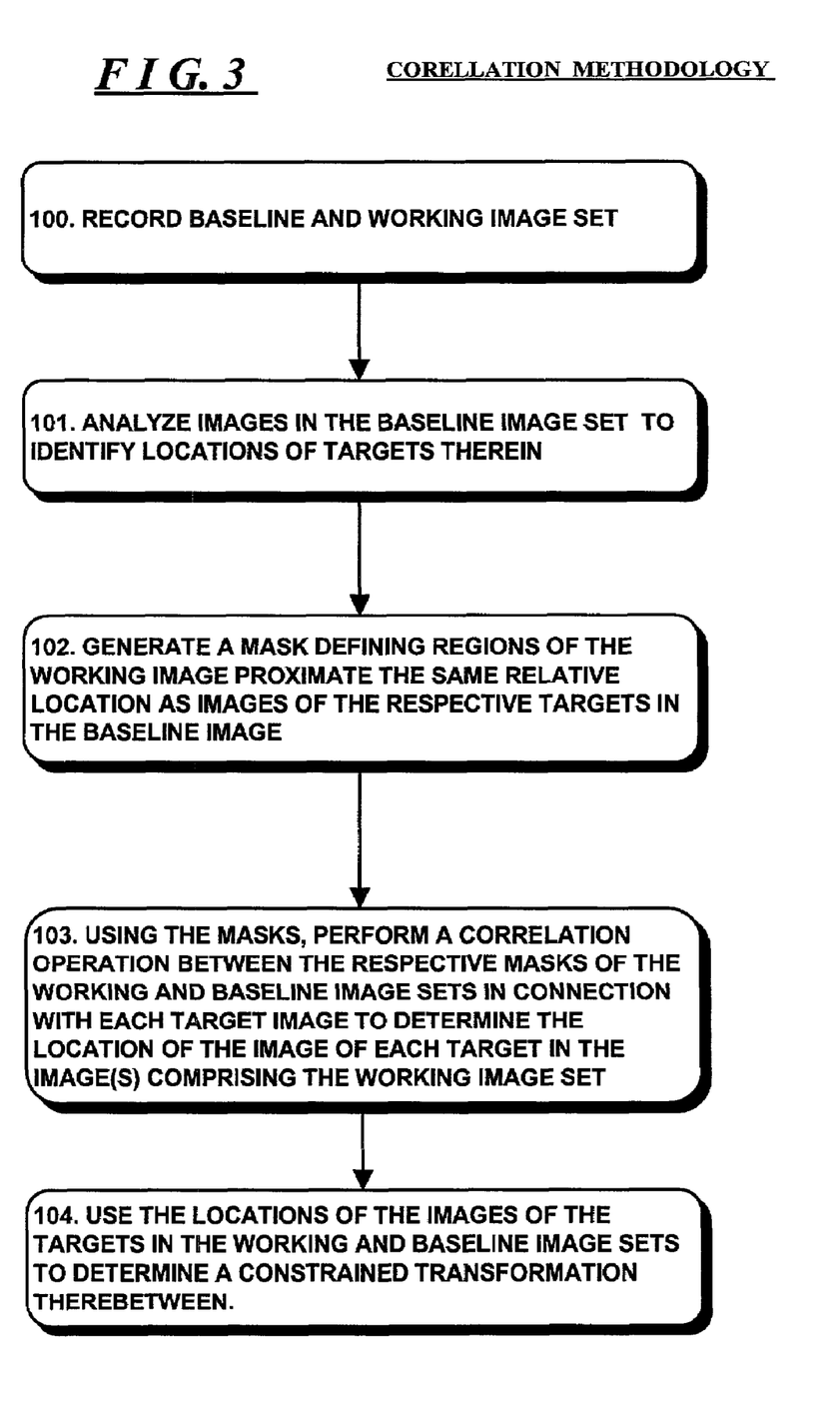
FIGS. 3 through 7 depict flowcharts describing operations performed by respective embodiments of the digital imaging system in connection with the invention.

In determining the transformation as between each working image and the associated baseline image, the image processing subsystem 13 makes use of one or more of a plurality of algorithmic techniques to attempt to locate the exact positions of the images of the targets in the baseline image and determine the relations between the positions of the targets 17 as between the baseline image and the working image. In accordance with all of the techniques in the algorithmic class, the image processing subsystem 13, after locating the images of the targets 17 in the baseline image, determines masks of regions in the working image proximate the same relative location as the images of the respective targets in the baseline image. In that operation, the image processing subsystem 13 uses the baseline image of a baseline image/working image pair to generate a mask defined by the images of the targets in the baseline image. Each element of the mask is centered on a respective target and has a size that is a selected ratio to the size of the respective target. The mask is used to define regions of the working image that will be processed using any of the techniques in the algorithm class, thus the sizes of the mask elements will be such as to preferably include the images of the targets 17 in the working image, but exclude images of the objects 16 in the working image. In accordance with one aspect of the algorithmic class, both images comprise pixels, and the image processing subsystem 13, after locating the pixels comprising the images of the targets 17 in the baseline image, can perform a pixel-by-pixel correlation between the working image and the baseline image, thus determining their relative positions in the corresponding images. After image processing subsystem 13 has identified the positions of the targets 17 in the baseline and working images, it can determine the transformation therebetween in a conventional manner.

Figure 4:
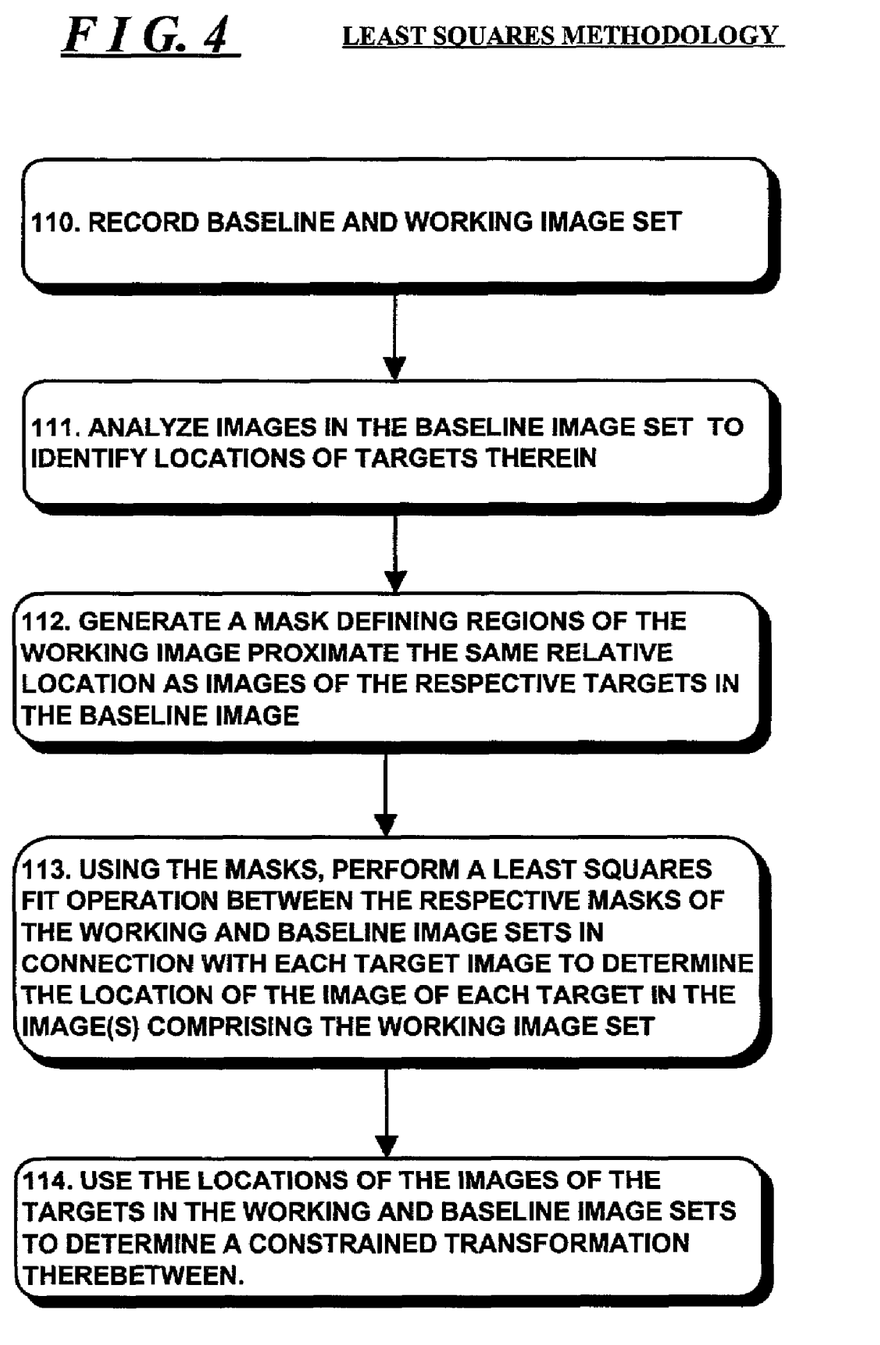

In accordance with another aspect of the techniques in the algorithmic class, the image processing subsystem 13 performs a least squares fit in a region of the working image proximate the same relative location as the image of the respective target in the baseline image. After determining locations of the targets in the set of working images, the image processing subsystem 13 uses those locations and the locations of the respective targets in the baseline images to determine the transformation between the working and baseline images.

Figure 5:
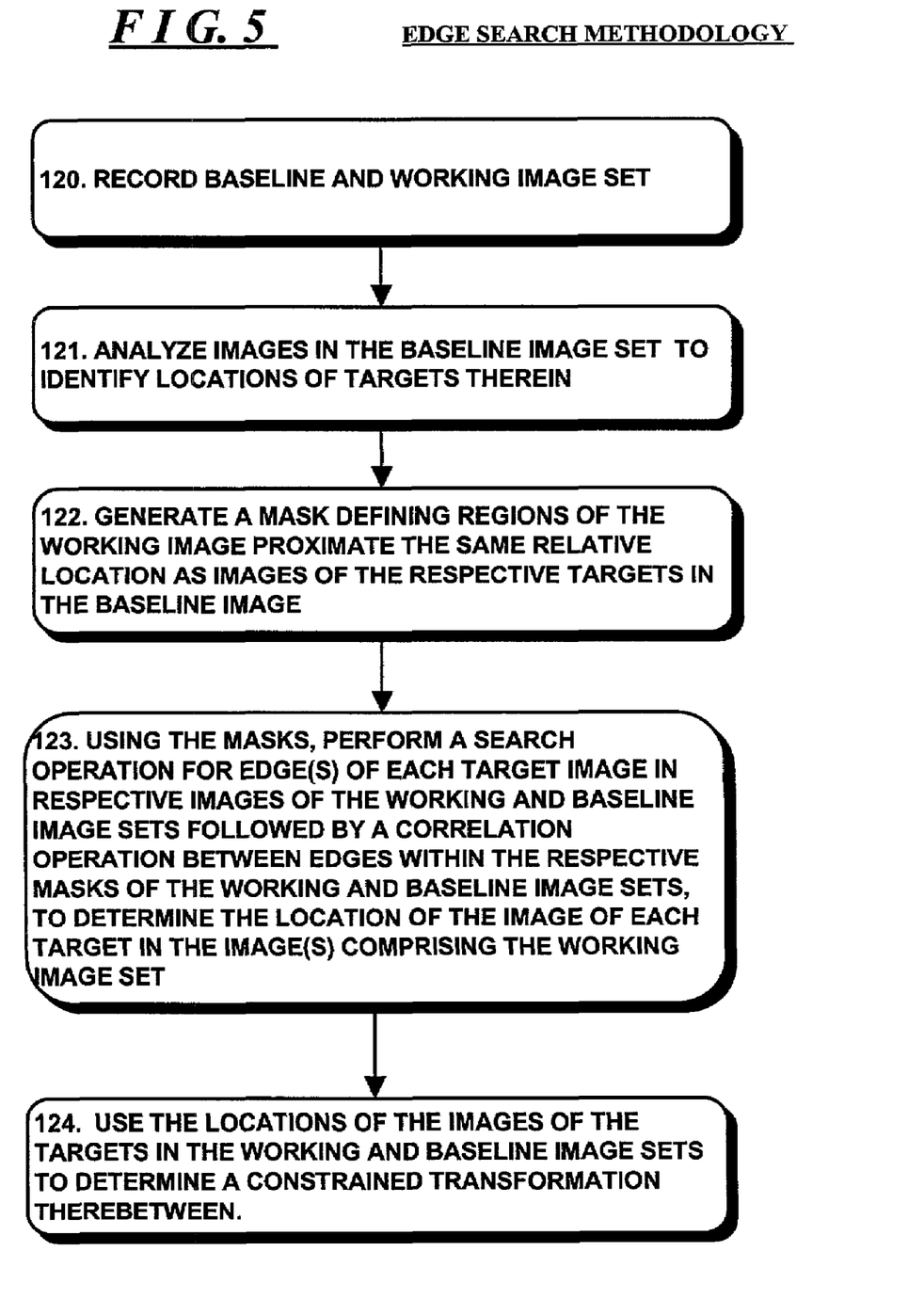

In accordance with yet another aspect of the techniques in the algorithmic class, the image processing subsystem 13 detects edges of the images of the targets in the baseline image and searches for a correlation between the edges of the images of the respective targets 17 in each baseline image and edges or portions of edges of the images of the corresponding targets 17 in the respective working image. The image processing subsystem 13 will, for the image of each target 17 in the baseline image, initially determine the contour of the edge in the baseline image. The image processing subsystem 13 thereafter performs a pixel-by-pixel search in the working image for the edge of the image in the working image. After determining locations of the targets in the set of working images, the image processing subsystem 13 uses those locations and the locations of the respective targets in the baseline images to determine the transformation between the working and baseline images.

Figure 6:
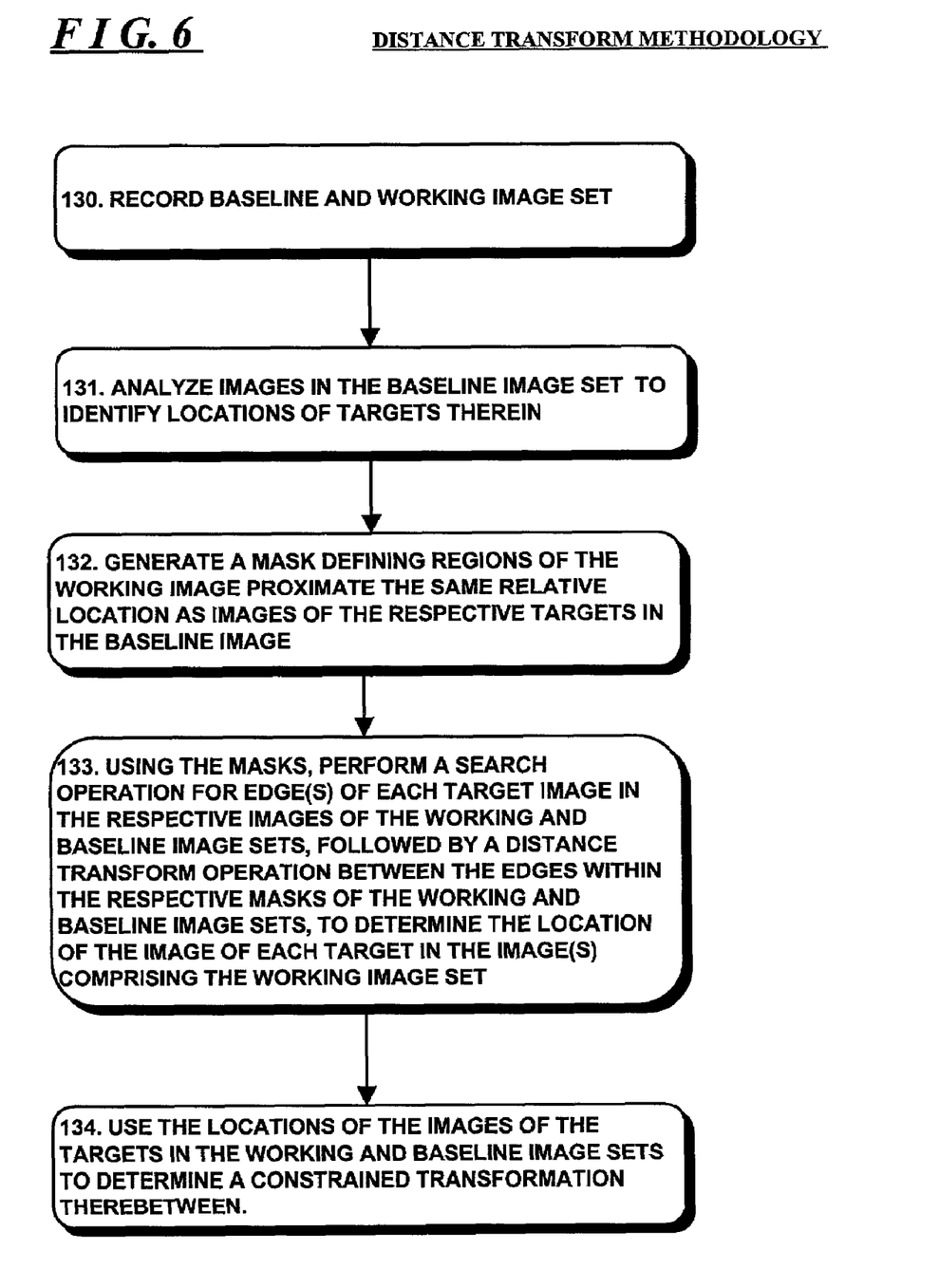

In accordance with yet another aspect of the techniques in the algorithmic class, the image processing subsystem 13 makes use of a distance transformation technique. In that technique, the image processing subsystem 13 initially locates the images of the targets 17 in the working image, using any convenient methodology, including, for example, a search technique described above. Thereafter, the image processing subsystem 13 processes the working image to determine the minimum distance of each pixel in the working image from a pixel comprising the edge of the image of a target 17, thereby creating a new image. The new image will be relatively dark in regions in which features of the baseline image are relatively near to features in the working image Since in the baseline image the only features are images of the targets 17, and since images of the targets 17 in both the baseline image and the working image will generally be in approximately the same positions in the two images, it is more likely that the new image will be relatively light in areas that are proximate the locations of the images of the respective targets in the working and baseline images, and not relatively light in areas of the new image that correspond to the locations of the images of the objects 16 in the working image. The image processing subsystem 13 then generates the transformation for relating the working image and the baseline image using the new "distance map" image instead of the working image.

Figure 7:
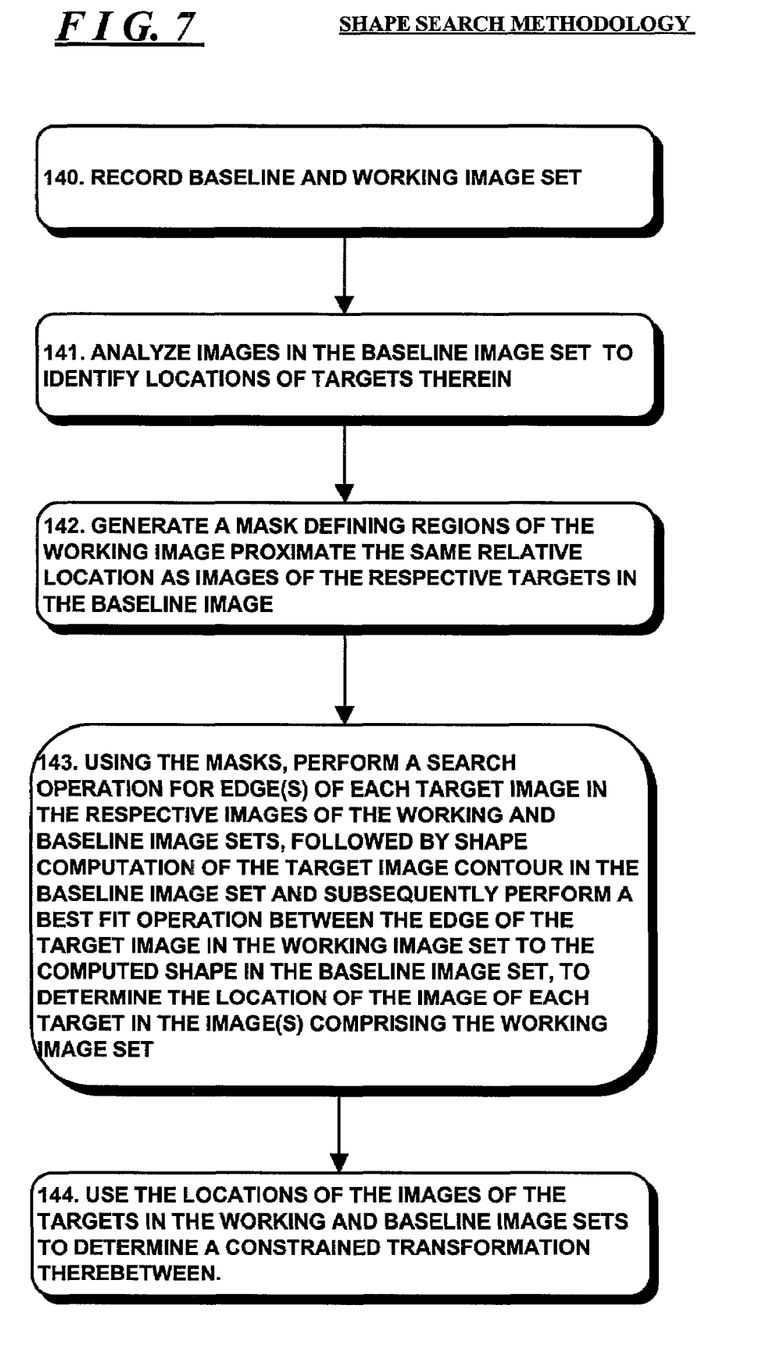

A further aspect of the techniques in the algorithmic class makes use of the fact that, in one embodiment, the targets 17 are generally circular or elliptical when viewed from a direction orthogonal to one surface. In addition, if a target is viewed, or an image of the target is recorded, from a direction that is not orthogonal to the circular surface, the target will appear as an ellipse. Accordingly, in this technique, the image processing subsystem 13 makes use of a shape fitting technique to determine the contour(s) of the image(s) of the target(s) in the baseline image. In that technique, the image processing subsystem 13 initially processes the baseline image to determine a shape for each image of a target in the baseline image. Thereafter, the image processing subsystem 13 uses the edge of the image of the corresponding target in the working image and attempts to find the location in the working image that provides the best fit for the previously-generated shape. In finding the location that provides the best fit, the image processing subsystem 13 determines the location for which the edge of the image of the target 17 best corresponds to the afore-mentioned shape. The location in the working image that provides the best fit for the shape is deemed to be the location of the image of the target in the working image. The image processing subsystem 13 can determine the location of the image of each target 17 in each of the working image in the same manner, and uses the locations as determined in both the baseline and working images to determine the transformation therebetween. It will be appreciated that, if the surfaces of the targets have a different shape, such as circular, rectangular, or elliptical, the image processing subsystem 13 can perform a similar operation to determine the shape of the smallest, for example, quadrilateral in the baseline image that will encompass the target, and thereafter perform corresponding operations in connection with the working image.

Since the images of targets may be deformed in the working images by the structured illumination that was provided when they were recorded, some portions of the images of the targets or the edges of the images of the targets may be missing in the working images. After the image processing subsystem 13 locates the edge of the image of the corresponding target 17 in the working image, a further embodiment of the algorithmic classes can generate a weighting value that represents the extent to which the contours of the edges in the two images correspond. Accordingly, if the edge of the image or the image itself of the target 17 in the working image is not extensively deformed by the structured illumination, the weighting value will be relatively high, whereas if the edge of the image is extensively deformed, the weighting value will be relatively low. The image processing subsystem 13 will then use the images of the targets in the working and baseline images, weighted by the respective weighting values generated therefore, to determine the transformation therebetween. This transformation, computed between the target images in the baseline and working image sets, is an affine transformation and unique in that it accounts for the rigid motion of all targets in the scene, and not a separate transformation for each target.

FIGS. 3 though 7 depict flowcharts of operations performed by the image processing subsystem 13 in connection with the techniques described above. Since the operations are apparent from the above description, the flowcharts will not be described further herein.

The invention provides a number of advantages. In particular, the invention provides a number of arrangements that allow for recording of images of objects 16 and targets 17 in a scene 15, providing structured illumination for the objects 16, while reducing or eliminating noise in connection with the positions of the targets in the images that can arise from the use of structured illumination.

Although the image processing subsystem has been described as generating a transformation between the working and baseline image sets, which can be used in transforming the local coordinate system associated with the working image set to the global coordinate system, it will be appreciated that the image processing subsystem can instead use the locations of the targets in the image(s) comprising the working image set, as determined using the baseline image set, to determine a tranformation directly between the local coordinate system associated with the working image set and the global coordinate system.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital imaging system comprising:
   A. a scene illumination arrangement configured to illuminate said scene comprising at least one object and at least one target independent of said at least one object, said at least one object and at least one target capable of being illuminated, the scene illumination arrangement being configured to illuminate at least the at least one object and at least one target to facilitate disambiguation between the at least one object and the at least one target;
   B. an image recording device configured to record at least one image of a scene when said scene is illuminated by said illumination arrangement,
   C. an image processing subsystem configured to process the at least one image to differentiate a part of said image corresponding to said at least one target from another part of said image corresponding to said at least one object in said at least one image and to identify a location of the at least one target appearing in the at least one image with respect to a local coordinate system associated with the location from which the image recording device recorded the at least one image of the scene, and for relating said local coordinate system to a global coordinate system, wherein the location of the said at least one target with respect to said global coordinate system is known independently of said at least one image.

2. A digital imaging system as defined in claim 1 in which
   A. the at least one target has a surface configured to reflect light of a selected wavelength;
   B. the scene illumination arrangement is configured to illuminate the scene with illumination of the selected wavelength; and
   C. the image processing subsystem is configured to identify the location of the image of the at least one target as the location in the at least one image of a region representing the image of light of the wavelength reflected by the surface of the at least one target.

3. A digital imaging system as defined in claim 2 in which the scene illumination arrangement is configured to illuminate the scene with uniform light of the selected wavelength.

4. A digital imaging system as defined in claim 3 in which the selected wavelength comprises a band of wavelengths.

5. A digital imaging system as defined in claim 2 in which the scene illumination arrangement is further configured to illuminate the scene with structured illumination at a further wavelength that is not reflected by the at least one target.

6. A digital imaging system as defined in claim 5 in which the further wavelength comprises a band of wavelengths, the band of wavelengths and the selected wavelength being disjoint.

7. A digital imaging system as defined in claim 1 in which
A. the at least one target has a surface configured to reflect light of a selected wavelength;
B. the scene illumination arrangement is configured to illuminate the scene with uniform illumination of the selected wavelength, and structured illumination of at least one other wavelength; and
C. the image recording device is configured to record two images,
   i. one of said images comprising an image recorded while the scene illumination arrangement illuminates the scene with light of the selected wavelength; and
   ii. the other of said images comprising an image recorded while the scene illumination arrangement illuminates the scene with light of the at least one other wavelength.

8. A digital imaging system as defined in claim 7 in which the image recording device includes a beam splitter arrangement configured to divide light reflected thereto from the scene into two portions, and two filters, each to allow light of one of the respective wavelengths to pass to an image recording medium.

9. A digital imaging system as defined in claim 1 in which
A. the scene illumination arrangement is configured to illuminate the scene with illumination of having respective selected polarization directions, illumination of one polarization direction being uniform illumination and illumination of the other polarization direction being structured illumination;
B. the at least one target having a surface configured to reflect illumination incident thereon in a manner to preserve the polarization direction and the at least one object having a surface configured to reflect illumination incident thereon in a manner to not preserve the polarization direction;
C. the image recording device is configured to record an image of the scene such that the image of the at least one target reflects uniform illumination incident on the surface thereof; and
D. the image processing subsystem is configured to identify the location of the image of the at least one target in relation to the uniformity of the image thereof as recorded by the image recording device.

10. A digital imaging system as defined in claim 9 in which
A. the scene illumination arrangement is configured to illuminate the scene such that the uniform illumination is in a first selected direction and the structured illumination is in a second selected direction perpendicular to the first selected direction; and
B. the image recording device is provided with a polarization arrangement configured to pass illumination in the first selected direction to an image recording medium, thereby ensuring that structured illumination reflected from the surface of the at least one target is not depicted in the image recorded by the image recording medium.

11. A digital imaging system as defined in claim 1 in which
A. the at least one target is located in a position in the scene displaced from the position of the at least one object;
B. the scene illumination arrangement is configured to provide uniform illumination in at least one region of the scene in which the at least one target is located, and structured illumination in at least one portion of the scene in which the at least one object is located; and
C. the image processing subsystem is configured to identify the location of the image of the at least one target in relation to the uniformity of the image thereof as recorded by the image recording device.

12. A digital imaging system as defined in claim 11 in which
A. the scene illumination arrangement is configured to provide uniform illumination and structured illumination; and
B. the image processing subsystem is configured to
   (i) enable the scene illumination arrangement to illuminate the scene by uniform illumination, and enable the image recording device to record a first image of the scene, and use the first image to determine the location of the at least one target in the scene; and
   (ii) thereafter enable the scene illumination arrangement to illuminate the portion of the scene at which the at least one target is located by uniform illumination and at least one other portion of the scene with structured illumination, and enable the image recording device to record a second image of the scene, and use the second image to determine the location of the at least one target in the scene, thereby to facilitate relating the local coordinate system associated with the location from which the image recording device recorded the second image of the scene to the global coordinate system.

13. A digital imaging system as defined in claim 12 in which the scene illumination arrangement includes a pattern generator configured to selectively generate uniform illumination for at least one portion of the scene and structured illumination for at least a second portion of the scene.

14. A digital imaging system as defined in claim 1 in which
A. the image recording device is configured to record successive images of the scene at points in time separated by a relatively short time interval; and
B. the scene illumination arrangement is configured to illuminate at least the at least one target with uniform illumination when the image recording device records one of said successive images, and the at least one object with structured illumination when the image recording device records the other of said successive images.

15. A digital imaging system as defined in claim 1 in which
A. the scene illumination arrangement is configured to provide uniform illumination and structured illumination; and
B. the image processing subsystem is configured to
   (i) enable the scene illumination arrangement to illuminate the scene by uniform illumination, and enable the image recording device to record a baseline image of the scene, and determine the location of the at least one target in the baseline image;

(ii) enable the scene illumination arrangement to illuminate the scene by structured illumination, and enable the image recording device to record a working image of the scene, and (iii) using the location of the at least one target in the baseline image, determine the location of the at least one target in the working image.

16. A digital imaging system as defined in claim 15 in which the image processing subsystem makes use of a selected search methodology, in which the image processing subsystem searches at least a region of the working image proximate the location of the at least one target in the baseline image, in determining the location of the at least one target in the working image.

17. A digital imaging system as defined in claim 16 in which, in the selected search methodology, the image processing subsystem searches at least one region of the working image proximate the location of an edge of the at least one target in the baseline image, in determining the location of the at least one target in the working image.

18. A digital imaging system as defined in claim 16 in which the at least one target has a selected shape, the search methodology reflecting the selected shape.

19. A digital imaging system as defined in claim 16 in which, in the selected search methodology, the image processing subsystem detects at least one edge of the at least one target in the baseline image and in the working image and performs a distance transform operation between them in order to determine the location of at least one target in the working image.

20. A digital imaging system as defined in claim 16 in which, in the selected search methodology, the image processing subsystem detects edges of the at least one target in the baseline and in the working image sets, determines a shape of a contour of the target image in the baseline image set and best fits the shape of the contour with the edge of the target image in the working image set in order to determine the location of at least one target in the working image.

21. A digital imaging system as defined in claim 16 in which the selected search methodology is a least squares fit methodology.

22. A digital imaging system as defined in claim 16 in which the image processing subsystem is further configured to generate a mask representing the image of the target in the baseline image, the image processing subsystem being further configured to use the mask to define the region in the working image in which it performs the selected search methodology.

23. A digital imaging system as defined in claim 22 in which the m ask includes a mask element that is a selected percentage of the size of the target in the baseline image, the mask element defining the region in the working image in which the image processing subsystem performs the selected search methodology.

24. A digital imaging system as defined in claim 15 in which the image processing subsystem is further configured to determine a transformation between the baseline image and the working image, thereby to facilitate relating the local coordinate system associated with the location from which the image recording device recorded the working image of the scene to the global coordinate system.

25. A digital imaging method comprising the steps of:
A. recording at least one image of a scene, said scene comprising at least one object and at least one target independent of said at least one object, said at least one object and at least one target capable of being illuminated, at least said at least one object and at least one target being illuminated in a manner to facilitate disambiguation between the at least one object and the at least one target;

B. processing the at least one image to differentiate a part of the image corresponding to said at least one target from another part of the image corresponding to said at least one object in said at least one image and to identify a location of the at least one target appearing in the at least one image with respect to a local coordinate system associated with a location from which the at least one image of the scene is recorded in step (A); and C. relating said local coordinate system to a global coordinate system, wherein the location of the said at least one target with respect to said global coordinate system is known independently of said at least one image.

26. A digital imaging method as defined in claim 25 in which
A. the at least one target has a surface configured to reflect light of a selected wavelength;
B. the scene illumination step includes the step of illuminating the scene with illumination of the selected wavelength; and
C. the image processing step includes the step of identifying the location of the image of the at least one target as the location in the at least one image of a region representing the image of light of the wavelength reflected by the surface of the at least one target.

27. A digital imaging method as defined in claim 26 in which the scene illumination step includes the step of illuminating the scene with uniform light of the selected wavelength.

28. A digital imaging method as defined in claim 27 in which the selected wavelength comprises a band of wavelengths.

29. A digital imaging method as defined in claim 26 in which the scene illumination step includes the step of illuminating the scene with structured illumination at a further wavelength that is not reflected by the at least one target.

30. A digital imaging method as defined in claim 29 in which the further wavelength comprises a band of wavelengths, the band of wavelengths and the selected wavelength being disjoint.

31. A digital imaging method as defined in claim 25 in which each of the at least one object and at least one target has a surface configured to reflect light of respective selected wavelengths,
A. the scene illumination step including the step of illuminating the scene with illumination of the respective selected wavelengths; and
B. the image processing step includes the step of identifying the location of the image of the at least one target as the location in the at least one image of a region representing the image of light of the wavelength reflected by the surface of the at least one target.

32. A digital imaging method as defined in claim 25 in which each of the at least one object and at least one target has a surface configured to reflect light of respective selected wavelengths;
A. the scene illumination step including the step of illuminating the scene with illumination of the respective selected wavelengths; and C. the image recording step includes the step of is configured to recording two images,
  i. one of said images comprising an image of light at the wavelength for which the surface of the target is configured to reflect and
  ii. the other of said images comprising an image at the wavelength for which the surface of the object is configured to reflect.

33. A digital imaging method as defined in claim 32 in which the image recording step includes the steps of
  A. dividing light reflected from the scene into two portions, and
  B. filtering each portion in such a manner as to allow light of one of the respective wavelengths to pass to an image recording medium.

34. A digital imaging method as defined in claim 25 in which the at least one target has a surface configured to reflect illumination incident thereon in a manner to preserve the polarization direction and the at least one object having a surface configured to reflect illumination incident thereon in a manner to not preserve the polarization direction,
  A. the scene illumination step including the step of illuminating the scene with illumination of having respective selected polarization directions, illumination of one polarization direction being uniform illumination and illumination of the other polarization direction being structured illumination;
  B. the image recording step includes the step of recording an image of the scene such that the image of the at least one target reflects uniform illumination incident on the surface thereof; and
  C. the image processing step includes the step of identifying the location of the image of the at least one target in relation to the uniformity of the image thereof as recorded by the image recording device.

35. A digital imaging method as defined in claim 34 in which
  A. the scene illumination step includes the step of illuminating the scene such that the uniform illumination is in a first selected direction and the structured illumination is in a second selected direction perpendicular to the first selected direction; and
  B. the image recording step includes a polarization step in which illumination is passed having a first selected direction to an image recording medium, thereby ensuring that structured illumination reflected from the surface of the at least one target is not depicted in the image recorded by the image recording medium.

36. A digital imaging method as defined in claim 34 in which the at least one target is located in a position in the scene displaced from the position of the at least one object;
  A. the scene illumination step includes the step of providing uniform illumination in at least one region of the scene in which the at least one target is located, and structured illumination in at least one portion of the scene in which the at least one object is located; and
  B. the image processing step includes the step of identifying the location of the image of the at least one target in relation to the uniformity of the image thereof as recorded by the image recording device.

37. A digital imaging method as defined in claim 36 in which
  A. initially
    (i) in connection with the scene illumination step, illuminating the scene by uniform illumination, and
    (ii) in connection with the image recording step, recording a first image of the scene, and
    (iii) in connection with the image processing step, using the first image to determine the location of the at least one target in the scene; and
  B. thereafter
    (i) in connection with the scene illumination step, illuminating the portion of the scene at which the at least one target is located by uniform illumination and at least one other portion of the scene with structured illumination, and
    (ii) in connection with the image recording step, recording a second image of the scene,
    (iii) in connection with the image processing step, using the second image to determine the location of the at least one target in the scene, thereby to facilitate relating the local coordinate system associated with the location from which the image recording device recorded the second image of the scene to the global coordinate system.

38. A digital imaging method as defined in claim 37 in which the scene illumination step includes the step of using a pattern generator configured to selectively generate uniform illumination for at least one portion of the scene and structured illumination for at least a second portion of the scene.

39. A digital imaging method as defined in claim 25 in which
  A. the image recording step includes the step of recording successive images of the scene at points in time separated by a relatively short time interval; and
  B. the scene illumination step includes the step of illuminating at least the at least one target with uniform illumination when one of said successive images is recorded, and the at least one object with structured illumination when the other of said successive images is recorded.

40. A digital imaging method as defined in claim 25 in which
  A. the scene illumination step includes the steps of providing uniform illumination and structured illumination; and
  B. in connection with the scene illumination step, illuminating the scene by uniform illumination, and
    (i) in connection with the image recording step, recording a baseline image of the scene,
    (ii) in connection with the image processing step, using the baseline image to determine the location of the at least one target in the scene; and
  C. in connection with the scene illumination step, illuminating the scene with structured illumination;
    (i) in connection with the image recording step, recording a working image of the scene, and
    (ii) in connection with the image processing step, using the location of the at least one target in the baseline image in connection with determining the location of the at least one target in the working image.

41. A digital imaging method as defined in claim 40 in which the image processing step includes the step of using a selected search methodology, in which the at least a region of the working image is searched proximate the location of the at least one target in the baseline image, in determining the location of the at least one target in the working image.

42. A digital imaging method as defined in claim 41 in which, in the selected search methodology, a search is performed in at least one region of the working image proximate the location of an edge of the at least one target in the baseline image, in determining the location of the at least one target in the working image.

43. A digital imaging method as defined in claim 41 in which the at least one target has a selected shape, the search methodology reflecting the selected shape.

44. A digital imaging method as defined in claim 41 in which, in the selected search methodology, the image processing step includes the step of detecting at least one edge of the at least one target in the baseline image and in the working image and performing a distance transform operation between them in order to determine the location of at least one target in the working image.

45. A digital imaging method as defined in claim 41 in which, in the selected search methodology, the image processing method includes the step of detecting at least one edge of the at least one target in the baseline image and in the working image, determining a shape of a contour of the target image in the baseline image set and best fits the shape of the contour with the edge of the target image in the working image set in order to determine the location of at least one target in the working image.

46. A digital imaging method as defined in claim 41 in which the selected search methodology is a least squares fit methodology.

47. A digital imaging method as defined in claim 40 in which the image processing step includes the steps of generating a mask representing the image of the target in the baseline image, and using the mask to define the region in the working image in which it performs the selected search methodology.

48. A digital imaging method as defined in claim 47 in which the mask includes a mask element that is a selected percentage of the size of the target in the baseline image, the mask element defining the region in the working image in which the selected search methodology is performed.

49. A digital imaging method as defined in claim 40 further comprising the step of determining a transformation between the baseline image and the working image, thereby to facilitate relating the local coordinate system associated with the location from which the image recording device recorded the working image of the scene to the global coordinate system.

* * * * *